US012331855B2

(12) United States Patent
Lippka

(10) Patent No.: US 12,331,855 B2
(45) Date of Patent: *Jun. 17, 2025

(54) PRE-ASSEMBLED PIPE COUPLING WITH MANUALLY MANIPULATABLE SEGMENTS

(71) Applicant: Tyco Fire Products LP, Cranston, RI (US)

(72) Inventor: Sandra M. Lippka, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,886

(22) Filed: Jun. 10, 2024

(65) Prior Publication Data

US 2024/0328547 A1    Oct. 3, 2024

Related U.S. Application Data

(63) Continuation of application No. 18/447,634, filed on Aug. 10, 2023, now Pat. No. 12,038,109, which is a
(Continued)

(51) Int. Cl.
*F16L 21/06* (2006.01)
*F16L 21/02* (2006.01)
(52) U.S. Cl.
CPC .............. *F16L 21/02* (2013.01); *F16L 21/065* (2013.01)
(58) Field of Classification Search
CPC ....... F16L 17/025; F16L 17/03; F16L 17/035; F16L 17/04; F16L 21/02; F16L 21/03;
(Continued)

(56) References Cited

U.S. PATENT DOCUMENTS 3,351,352 A    11/1967   Blakeley et al.
3,464,722 A     9/1969   Larkin
(Continued)

FOREIGN PATENT DOCUMENTS

EP    2 494 250 A1    9/2012
GB    1 129 246 A    10/1968
(Continued)

OTHER PUBLICATIONS

English Translation of Office Action Received for Taiwan Application No. 107118270, dated Apr. 16, 2019, 10 pages.
(Continued)

*Primary Examiner* — Aaron M Dunwoody
(74) *Attorney, Agent, or Firm* — Foley & Lardner LLP

(57) ABSTRACT

A pre-assembled pipe coupling includes a gasket, a housing surrounding the gasket, and a fastener. The housing has three segments sequentially coupled to each other to define an insertion boundary. A first segment includes a first mount extending lateral in a first direction from the wall and having a plurality of first lateral walls that define a first aperture, and a second mount extending laterally in a second direction from the wall, the second mount having a plurality of second lateral walls that define a second aperture. A second segment includes a first hook disposed in the first aperture and a first tab defining a first fastener aperture. A third segment includes a second hook disposed in the second aperture and a second tab defining a second fastener aperture. The fastener is disposed through the first fastener aperture and the second fastener aperture.

18 Claims, 15 Drawing Sheets

Related U.S. Application Data continuation of application No. 17/692,506, filed on Mar. 11, 2022, now Pat. No. 11,754,209, which is a continuation of application No. 16/616,145, filed as application No. PCT/US2018/034915 on May 29, 2018, now Pat. No. 11,313,496.

(60) Provisional application No. 62/512,452, filed on May 30, 2017.

(58) Field of Classification Search
CPC ....... F16L 21/065; F16L 21/022; F16L 23/08; F16L 55/172; F16L 55/1725; F16L 55/17
See application file for complete search history.

(56) References Cited

U.S. PATENT DOCUMENTS

| | | |
|---|---|---|
| 3,964,773 A | 6/1976 | Stade et al. |
| 4,225,160 A | 9/1980 | Ortloff |
| 4,702,499 A | 10/1987 | Deraymond et al. |
| 4,915,418 A | 4/1990 | Palatchy |
| 5,018,768 A | 5/1991 | Palatchy |
| 5,282,654 A | 2/1994 | Hendrickson |
| 5,509,702 A | 4/1996 | Warehime et al. |
| 5,499,849 A | 5/1996 | Fend |
| 5,758,907 A | 6/1998 | Dole |
| 6,139,069 A | 10/2000 | Radzik |
| 6,276,729 B1 | 8/2001 | Sanwald |
| 6,672,139 B2 | 1/2004 | Pampinella |
| 8,646,165 B2 | 2/2014 | Gibb et al. |
| 8,733,799 B2 | 5/2014 | Gibb et al. |
| 8,979,137 B2 | 3/2015 | Kimura |
| 10,571,054 B2 | 2/2020 | Cheng-Sheng |
| 2005/0212296 A1 | 9/2005 | Dole |
| 2005/0253383 A1 | 11/2005 | Gibb et al. |
| 2008/0007061 A1 | 1/2008 | Gibb |
| 2008/0284159 A1 | 11/2008 | Krehl |
| 2012/0006425 A1 | 1/2012 | Hayashi |
| 2012/0145270 A1 | 6/2012 | Krausz |
| 2012/0175875 A1 | 7/2012 | Gill |
| 2012/0248767 A1 | 10/2012 | Lippka |
| 2012/0256415 A1 | 10/2012 | Dole |
| 2014/0132000 A1* | 5/2014 | Ben-Horin .......... F16K 27/0218 285/373 |
| 2016/0010771 A1 | 1/2016 | Cheng-Sheng |
| 2017/0225218 A1 | 8/2017 | Cho |
| 2020/0088327 A1 | 3/2020 | Lippka |
| 2020/0088330 A1 | 3/2020 | Lippka |
| 2020/0103062 A1 | 4/2020 | Belen et al. |
| 2020/0284382 A1 | 9/2020 | Lenz et al. |
| 2020/0378532 A1 | 12/2020 | Tan et al. |
| 2020/0408339 A1 | 12/2020 | Tan et al. |
| 2021/0262595 A1 | 8/2021 | Zhang et al. |
| 2023/0160508 A1 | 5/2023 | Lippka |

FOREIGN PATENT DOCUMENTS

| | | |
|---|---|---|
| GB | 2 349 189 A | 10/2000 |
| WO | WO-2011/053590 | 5/2011 |
| WO | WO-2011/056512 A1 | 5/2011 |
| WO | WO-2014/135649 A1 | 9/2014 |

OTHER PUBLICATIONS

English Translation of Office Action Received for Taiwan Application No. 107118270, dated Aug. 29, 2019, 3 pages.

International Search Report and Written Opinion for International Application No. PCT/US2018/034915, mail date Jul. 30, 2018, 18 pages.

* cited by examiner

PRE-ASSEMBLED PIPE COUPLING WITH MANUALLY MANIPULATABLE SEGMENTS

CROSS-REFERENCE TO RELATED APPLICATIONS

The present disclosure is a continuation of U.S. patent application Ser. No. 18/447,634, filed Aug. 10, 2023, which is a continuation of U.S. patent application Ser. No. 17/692,506, filed Mar. 11, 2022, which is a continuation of U.S. patent application Ser. No. 16/616,145, filed Nov. 22, 2019, which is a national stage application of International Application No. PCT/US2018/034915, filed May 29, 2018, which claims the benefit of and priority to U.S. Provisional Application No. 62/512,452, titled "Pre-Assembled Pipe Coupling with Manually Manipulatable Segments," filed May 30, 2017, the disclosures of each of which are incorporated herein by reference in their entireties.

BACKGROUND

Pipe couplings can be used to secure multiple pipe ends to one another. Pipe couplings can include seals, such as gaskets, to prevent fluid from leaking out of the pipes at the pipe coupling.

SUMMARY

One implementation of the present disclosure is a pre-assembled pipe coupling for insertion of pipe ends. The pre-assembled pipe coupling includes a gasket for forming a seal about a pipe joint, a housing surrounding the gasket, and a fastener. The gasket includes an annular base disposed about a gasket axis, a central flange extending from the annular base toward the gasket axis, the flange being disposed about a central plane perpendicular the gasket axis, a first side flange spaced from the central flange and extending from the annular base toward the gasket axis, the first side flange having a first sealing lip, a second side flange spaced from the central flange opposite the first side flange and extending from the annular base toward the gasket axis, the second side flange having a second sealing lip. The housing has three segments, the three segments being sequentially coupled to each other to define an insertion boundary, each segment having a wall with an exterior surface and interior surface, the interior surface being disposed symmetrically about a medial plane, the wall having a medial portion, a first lateral portion connected to the medial portion, and a second lateral portion connected to the medial portion, the second lateral portion being spaced from the first lateral portion along the coupling axis so that the interior surface defines a cavity, the first and second lateral portions having pipe engagement members. A first segment of the three segments including a first mount extending lateral in a first direction from the wall, the first mount having a plurality of first lateral walls that define a first perimeter of a first aperture, and a second mount extending laterally in a second direction from the wall, the second mount having a plurality of second lateral walls that define a second perimeter of a second aperture. A second segment of the three segments including a first hook disposed in the first aperture and a first tab defining a first fastener aperture. A third segment of the three segments including a second hook disposed in the second aperture and a second tab defining a second fastener aperture. The fastener is disposed through the first fastener aperture and the second fastener aperture.

Another implementation of the present disclosure is a pre-assembled pipe coupling for insertion of pipe ends. The pre-assembled pipe coupling includes a gasket for forming a seal about a pipe joint, and a housing surrounding the gasket. The gasket includes an annular base disposed about a gasket axis, a central flange extending from the annular base toward the gasket axis, the flange being disposed about a central plane perpendicular the gasket axis, a first side flange spaced from the central flange and extending from the annular base toward the gasket axis, the first side flange having a first sealing lip, a second side flange spaced from the central flange opposite the first side flange and extending from the annular base toward the gasket axis, the second side flange having a second sealing lip. The housing includes a plurality of segments, the plurality of segments being sequentially attached to each other and manually manipulated to define an insertion boundary, each segment having a wall with an exterior surface and interior surface, the interior surface being disposed symmetrically about a medial plane, the wall having a medial portion, a first lateral portion connected to the medial portion, and a second lateral portion connected to the medial portion, the second lateral portion being spaced from the first lateral portion along the coupling axis so that the interior surface defines a cavity, the first and second lateral portions having pipe engagement members. At least one segment includes a first mount and a second mount, the first mount extending lateral in a first direction from the wall, the first mount having a plurality of first lateral walls that define a first perimeter of a first aperture. The second mount extends laterally in a second direction from the wall, the second mount having a plurality of second lateral walls that define a second perimeter of a second aperture, the second perimeter and the first perimeter being located on a common plane.

Another implementation of the present disclosure is a method of joining a pair of pipe ends in an axial arrangement with a pre-assembled coupling. The pre-assembled pipe coupling includes a housing surrounding a coupling axis and an annular gasket having a gasket axis contained within the housing such that the gasket axis is aligned parallel with the coupling axis, the gasket having an annular base with a central flange extending from the annular base toward the gasket axis with a pair of side flanges spaced oppositely about the central flange, each side flange having a sealing lip for receiving one of the pipe ends, the housing having a having a plurality of segments and a plurality of attachment mechanisms, each segment having a first terminal end a second terminal end in an interconnected relationship in which the terminal end of one segment is attached to a terminal end of another segment by one of the plurality of attachment mechanisms, each segment having a pair of lateral portions axially spaced apart with each lateral portion having a pipe engagement member. The method includes manually manipulating the plurality of interconnected segments to define an insertion boundary on each side of the housing that surrounds the coupling axis; axially inserting one of the pipe ends through the insertion boundary on each side of the housing; gripping the pipe ends with the sealing lips; and adjusting one of the attachment mechanisms so that the pipe engagement members engage the pipe ends and the sealing lips form a fluid tight seal about the pipe ends.

BRIEF DESCRIPTION OF THE DRAWINGS

The accompanying drawings, which are incorporated herein and constitute part of this specification, illustrate exemplary embodiments of the present disclosure, and together, with the general description given above and the detailed description given below, serve to explain the features of the present disclosure.

DETAILED DESCRIPTION

The present disclosure relates generally to pipe couplings and in particular pipe couplings with an outer housing and internal gasket that are pre-assembled before axially receiving two pipe ends to be joined in an axial alignment.

Figure 1:
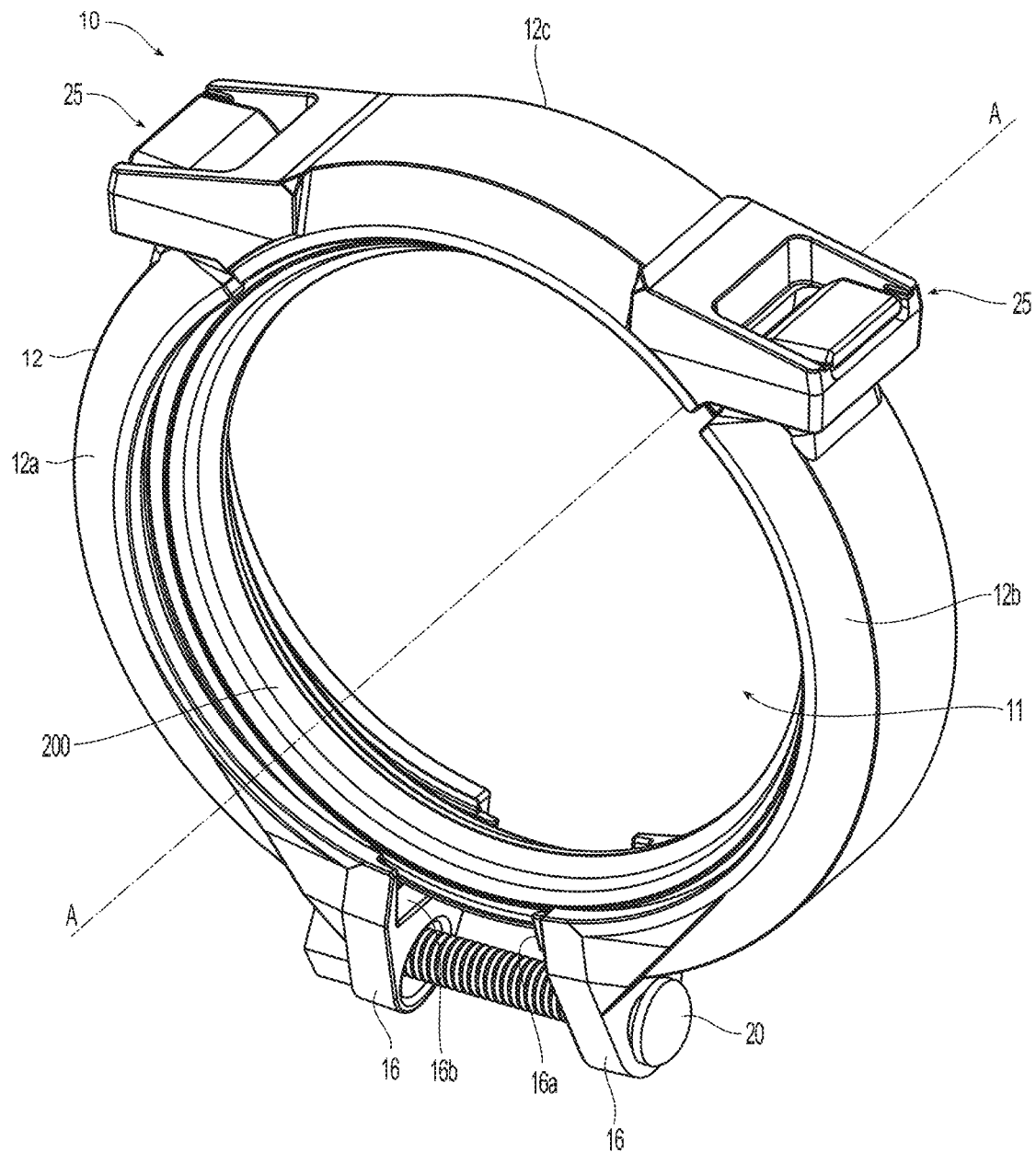
FIG. 1 is a perspective view of an embodiment of a pre-assembled pipe coupling.

Shown in FIG. 1 is a pipe coupling 10 (e.g., a pre-assembled pipe coupling) that can join two pipe ends in an axial alignment. As understood the pipe ends can be of any fluid carrying structure, such as for example, the end of a pipe, a pipe fitting, valve, or a fire protection sprinkler. The pre-assembled coupling includes a housing and gasket 200 disposed within the housing so that the housing and the gasket surround a coupling axis A-A. The housing has a plurality of coupling segments 12a, 12b, 12c. Each segment has two terminal ends, each of which in the pre-assembled coupling is attached to another terminal end of another segment via an attachment mechanism. The plurality of segments are attached or connected together in a sequential arrangement about the gasket 200. The sequential arrangement is manually manipulated to define an insertion boundary 11 on each side of the housing that surrounds the coupling axis A-A and through which a pipe end can be axially inserted. The insertion boundary 11 defines an area bound by the sequentially connected segments. The insertion boundary 11 is defined by the portion of each segment that surrounds a central location within the area. The distance between the central location of the area and each portion of a respective segment is at least half the outer diameter of the pipe end to be inserted into the insertion boundary 11 and at its maximum is sufficient to contain the gasket 200 within the housing. Due to the manually manipulated distance relationship between each segment and the central location of the area, the insertion boundary has minimum spans that are greater than the diameter of the pipe to be inserted into the pre-assembled coupling and a maximum span that is less than the outer diameter of the gasket 200. The insertion boundary 11 can have various configurations due to the relative orientations of the segments and the attachment mechanisms to one another. Regardless of the selected orientation of the segments and the attachment mechanisms, and/or the number of segments and attachment mechanisms, the spans of the insertion boundary can have sufficient size to allow the pre-assembled coupling 10 to axially receive a pipe end. The plurality of coupling segments 12a, 12b, 12c can be made from more rigid material than existing systems, as the coupling segments 12a, 12b, 12c are not required to be deformable to allow effective installation of the pipe coupling 10.

The sequential arrangement of the segments of the plurality of segments provides for the pre-assembled coupling 10. A pre-assembled coupling can be a coupling in which all of the coupling segments are attached together to be manually manipulated into a spaced apart arrangement to surround and locate the gasket of the coupling 10 in a manner as described herein for axial insertion of pipe ends through the insertion boundary 11, into the housing, and into the gasket 200. The housing can include three segments. Any number of segments can be utilized with the appropriate attachment mechanisms so long as the segments are attached together in an interconnected arrangement about the gasket which can be manually manipulated to provide a pre-assembled coupling arrangement.

The pre-assembled coupling 10 utilizes at least two attachment mechanisms to attach the plurality of segments together. As depicted in FIG. 1, one of the attachment mechanisms is a clenchable fastener, such as a threaded bolt and a nut; any suitable clenchable fastener can be utilized, such as for example a toggle, and the other of the attachment mechanisms is an interlock. The three segments can be attached together utilizing two interlocks and a single clenchable fastener. The interlocks and clenchable fastener can allow the segments of the housing to be held together in an interconnected relationship which can be manually manipulated and spaced apart to receive the pipe ends and thereafter be tightened about the pipe ends with the single clenchable fastener to form a fluid tight relationship. Further facilitating a pipe joint formation via the pre-assembled coupling 10 is a gasket 200 described herein that is held and contained within the pre-assembled coupling 10. The gasket 200 can be an annular member having an internal and external geometry that facilitates receipt, insertion, gription and fluid tight sealing of the pipe ends. The internal geometry of the gasket 200 engages the outer surface of the pipe ends to allow the pipe to be inserted and then form a fluid tight seal. The external geometry of the gasket 200 engages the internal surfaces of the housing to center the gasket within the housing and properly locate the gasket 200 about the interface between the pipe ends to form an effective fluid tight seal. The gasket 200 can allow pipe ends 5a, 5b to be inserted into pre-assembled coupling 10 without gasket 200 falling out of pre-assembled coupling 10, such as due to the geometry of gasket 200 allowing for gap 22 shown in FIG. 3.

Figure 2:
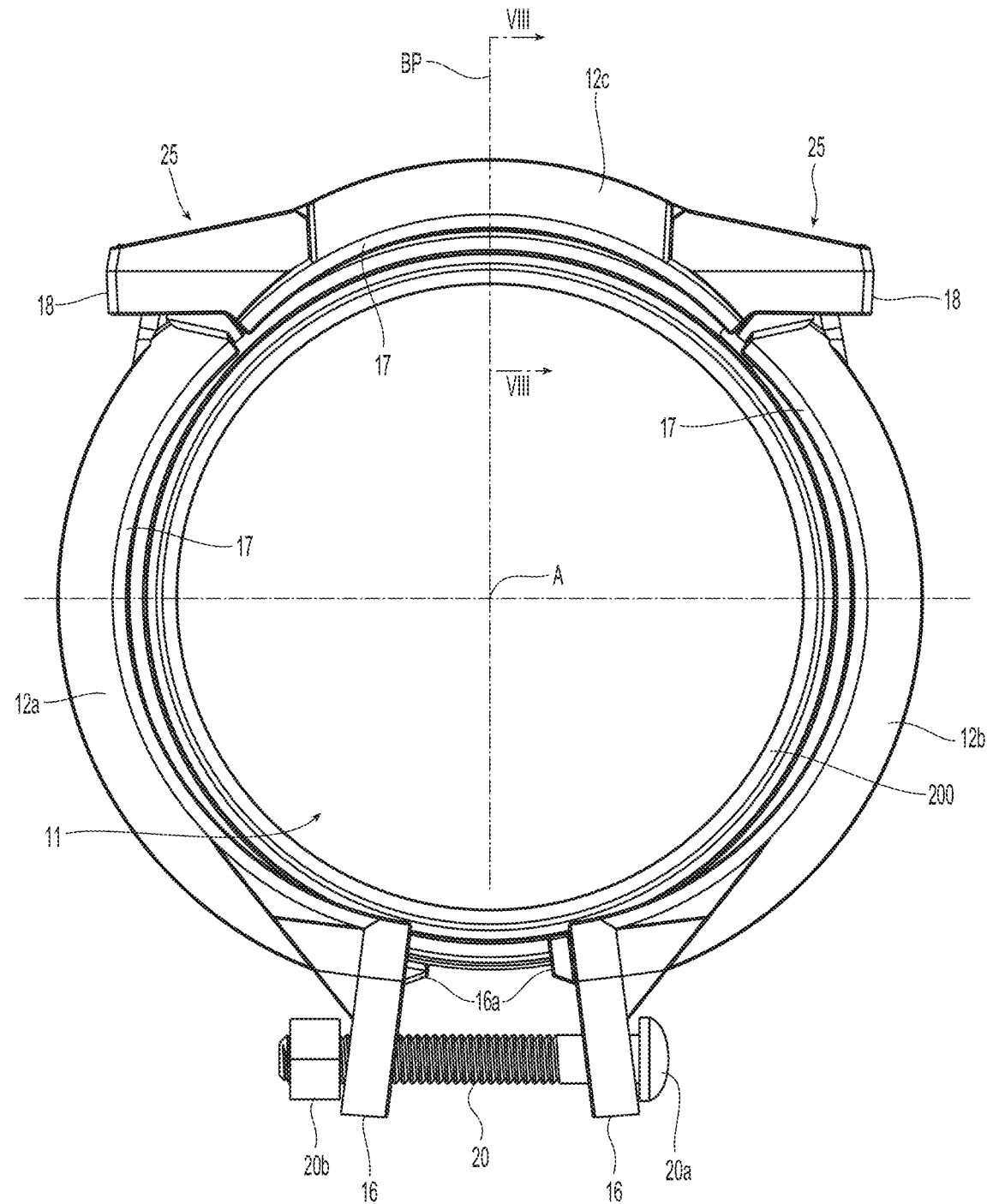
FIG. 2 is an elevation view of the pre-assembled pipe coupling of FIG. 1.
Figure 3:
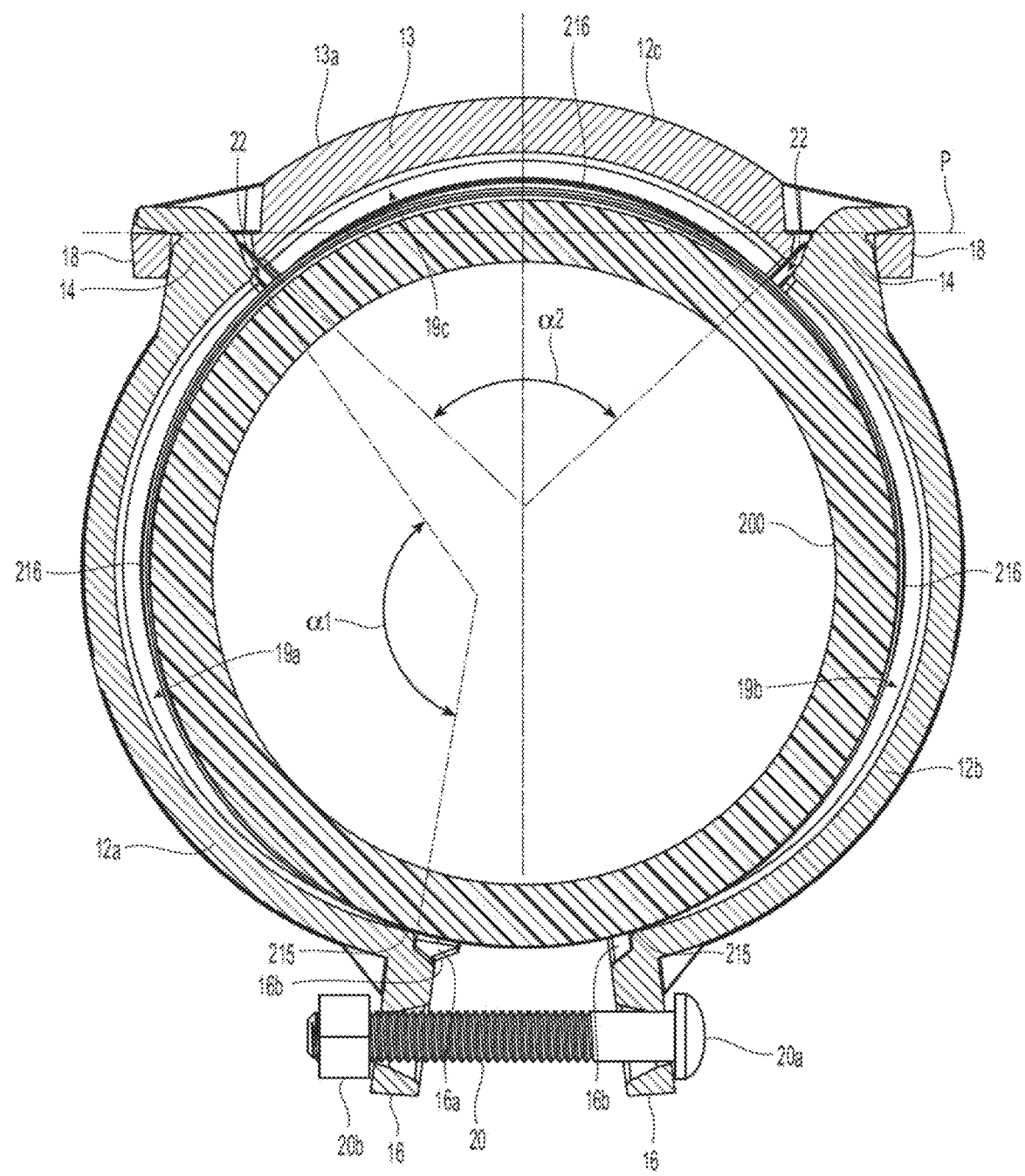
FIG. 3 depicts a configuration (an open configuration achieved by manual manipulation of the housing segments) of the pre-assembled pipe coupling for receipt of a pipe end.
Figure 4:
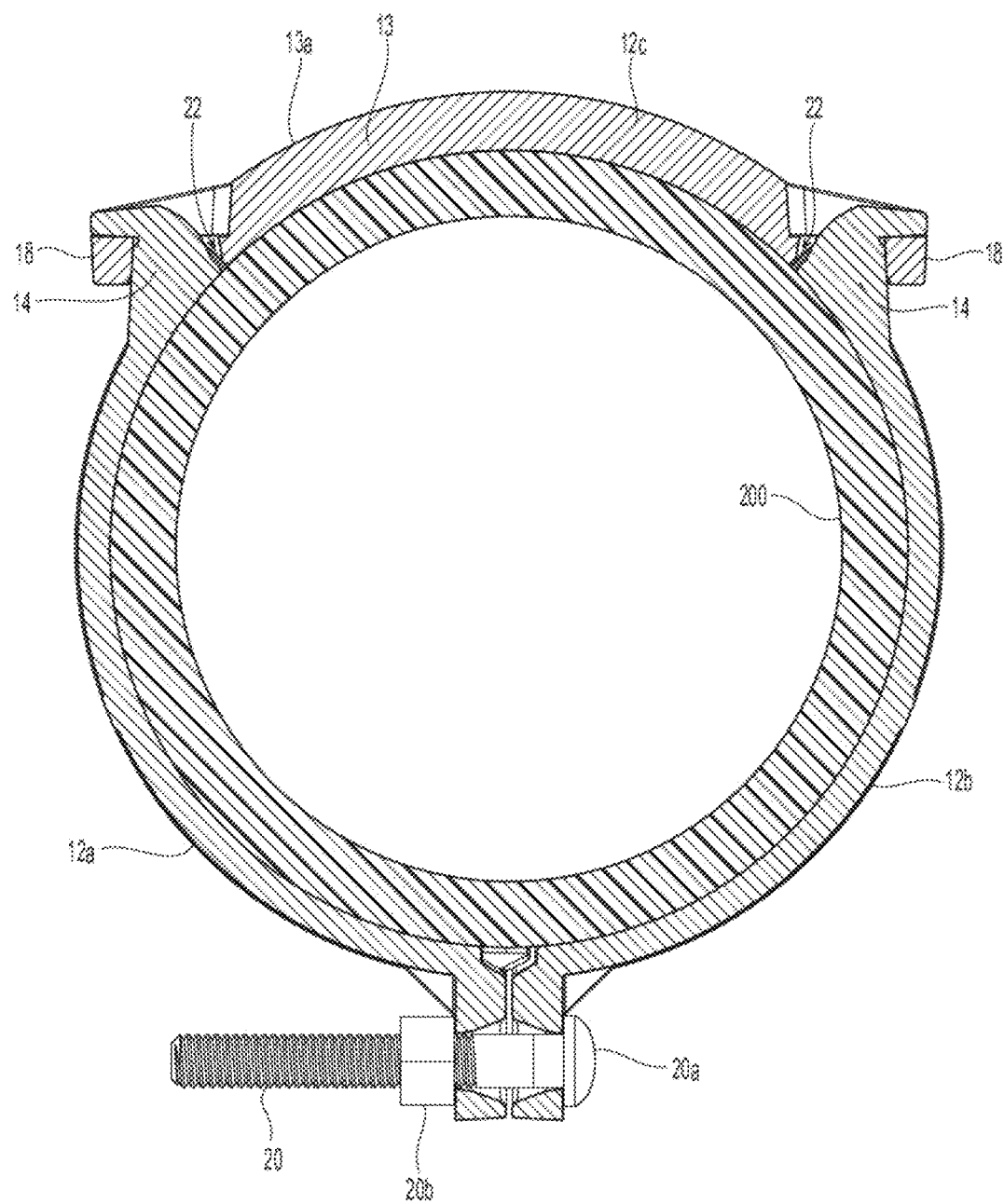
FIG. 4 depicts a configuration (a closed configuration) of the pre-assembled pipe coupling for forming a fluid tight seal about a pair of pipe ends.

FIGS. 2-4 depict a plan view of the coupling 10 with the housing surrounding the gasket 200, the gasket 200 depicted as being annular, in which each of the housing and the gasket 200 circumscribe the coupling axis A-A. The housing includes three segments 12a, 12b, 12c sequentially attached to each other that can be manually spaced apart (e.g., using manually manipulatable segments 25) to define the insertion boundary 11 about the coupling axis A-A. With the insertion boundary 11 defined by the manual manipulation of the segments of the housing, the gasket 200 can be contained within the housing in a manner that allows the gasket to move within the housing. Each segment 12a, 12b, 12c generally is an arcuate member with a wall 13 having an exterior surface 13a and an interior surface 13b. As depicted in FIGS. 2-4, the three segments can include two identical clamp segments 12a, 12b and a bridge segment 12c extending between the two identical clamp segments 12a, 12b.

Figure 8:
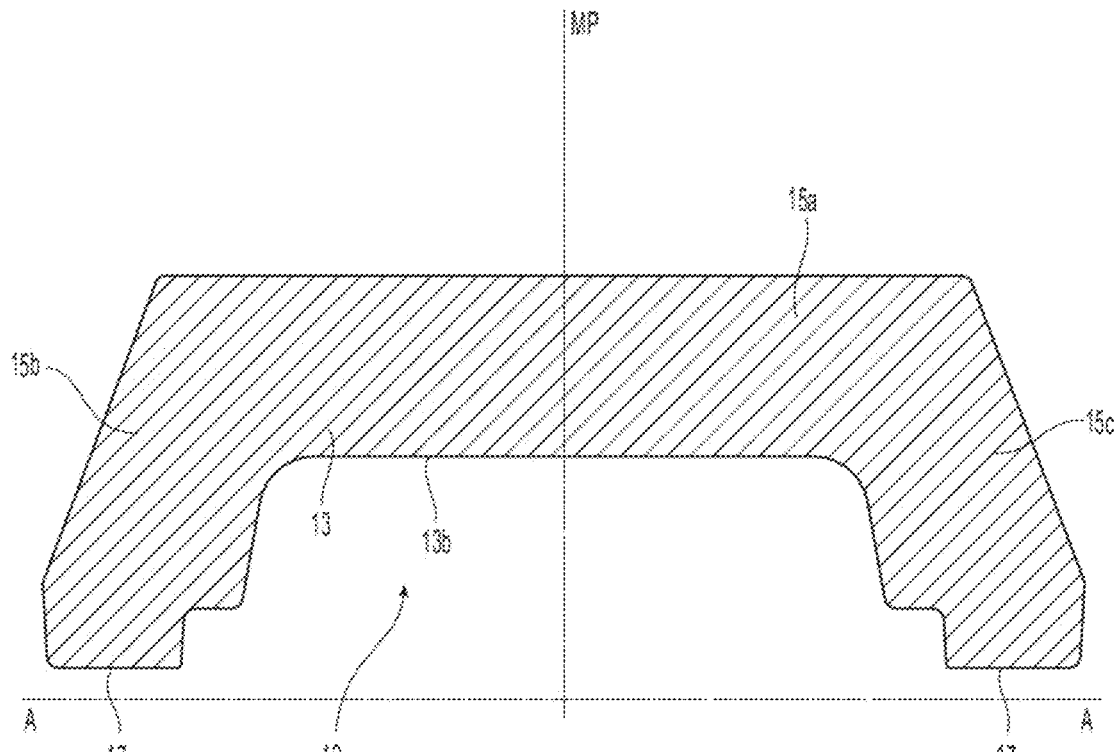
FIG. 8 is a partial cross-sectional view of a segment for use in the pre-assembled coupling of FIG. 1.

As seen in the cross-sectional view of the bridge segment 12c shown in FIG. 8, the interior surface 13b can be symmetrical about a medial plane MP which is disposed perpendicular to the gasket axis A-A. The wall 13 has a medial portion 15a, a first lateral portion 15b, and a second lateral portion 15c with the medial portion 15a extending between the first and second lateral portions 15b, 15c. Accordingly, the second lateral portion 15c is spaced apart from the first lateral portion 15b along the coupling axis A-A so that the interior surface 13b defines a cavity 19 for containing the gasket 200. Each of the first and second lateral portions 15b, 15c can extend between the terminal ends of the segment and can include a pipe engagement member 17 for engaging the outer surface of the pipe ends, such as to engage grooves formed at the pipe ends 5a, 5b. The pipe engagement members 17 prevent or restrict the axial movement of the pipes by engaging the grooves of the pipe ends 5a, 5b. The pipe engagement members 17 can be utilized with other pipe configurations, such as for example, pipes with a shoulder. The pipe engagement members 17 can be configured to bite into a plain end pipe. The pipe engagement members 17 can be curved, as seen for example in FIG. 2, to engage the outer pipe surface. The pipe engagement members 17 can include one or more projections which extend in the axial direction to grip a surface forming the pipe groove.

With reference to FIG. 3, a hook 14 is depicted that can be integrally formed with each of the twin clamp segments 12a, 12b. The hook 14 is formed at one terminal end of the clamp segment and a fastener tab 16 at the opposite terminal end of the segment. The cavity 19a can traverse an arc of about 135° about a central axis of curvature of the clamp segment that extends parallel to the coupling axis A-A. The bridge segment 12c can be symmetrical about a bisecting plane BP with twin mounts 18 identically formed at opposite terminal ends of the segment disposed symmetrically about the bisecting plane BP and laterally of the wall 13 of the bridge segment 12c. Each of the mounts 18 can define opening or aperture 22 through which the hook 14 of the clamp segments 12a, 12b extend. The bridge segment 12c can be formed such that the cavity 19c traverses an arc of about 90° about a central axis of curvature of the bridge segment that extends parallel to the coupling axis A-A. While the segments are depicted using a cavity that traverse arcs of about 135° and about 90° respectively about a center of curvature, any combination of suitable constant arcs could be utilized so long as the coupling segments can be attached with an appropriate attachment mechanism to allow for manual manipulation of the coupling segments and provide the pre-assembled coupling.

A fastener 20 can join the clamp segments 12a, 12b to one another. The fastener 20 can be clenchable. The fastener 20 can be disposed diametrically from the bridge segment 12c in the through holes or apertures formed in the respective fastener tabs 16 of the twin clamp segments 12a, 12b. Due to the manual manipulation of the twin clamp segments in opposite directions, the head of the bolt presents a first securement portion 20a in contact with one fastener tab 16 and the nut presents a second securement portion 20b of the fastener 20 in contact with the other fastener tab 16 to define the required spacing between the two clamp segments 12a, 12b for formation of the insertion boundary 11. In FIG. 3, the nut 20b is shown at a thread location on the fastener 20 proximate the tip or leading end of the fastener, which defines the desired manual manipulation location for the twin clamp segments 12a, 12b. The nut can maintain a position on the threaded fastener. A sealant or adhesive material can be applied to the nut 20b to secure the nut 20b to the fastener 20, and to prevent unintended loosening between the threaded components due to shock or vibration. A mechanical fastener, such as for example a fixed pin or washer (not shown), can be positioned at the leading end of the fastener 20 to secure the nut 20b in location to define the desired manual manipulation location for the twin clamp segments 12a, 12b, and to prevent the unintended separation of the nut 20b from the fastener 20. The through holes of the fastener tabs 16 can be unthreaded and non-circular, and can be oval in shape. To prevent the bolt from freely spinning within the through hole, the bolt can include a complimentary oval shaped shanked portion to seat within the through hole of the fastener tab 16. With the bolt prevented from freely spinning within the through holes, the fastener 20 can be tightened and more specifically, the nut 20b can be tightened about the bolt to bring the fastener tabs 16 in a confronting relation to provide sufficient sealing of the gasket 200 about the pipe ends.

Figure 2A:
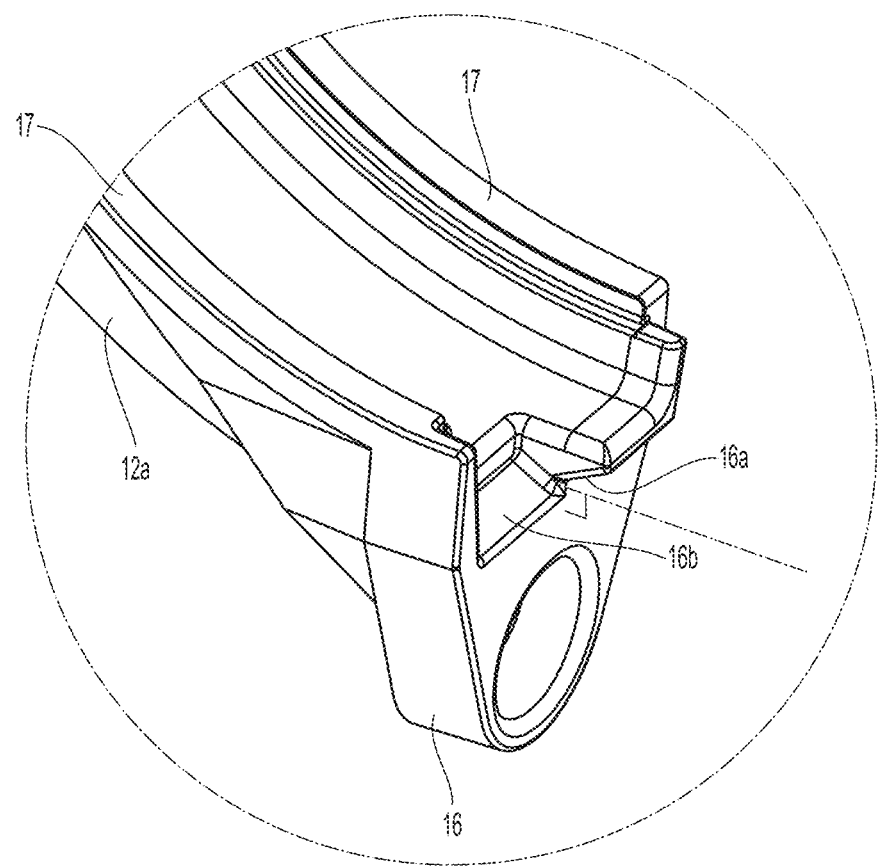
FIG. 2A is a detailed view of a terminal end of a housing segment for use in the pre-assembled pipe coupling of FIG. 1.

FIG. 4 depicts the fastener 20 with the nut 20b adjusted to be completely threaded onto the bolt such that the nut 20b and head 20a tightly bring the fastener tabs 16 of the clamp segments 12a, 12b in the confronting relationship. The fastener tabs 16 include complementary tongue 16a and recess 16b which engage one another to facilitate alignment between the fastener tabs 16. On each fastening tab 16, the tongue 16a and the recess 16b can be located side by side with the tongue 16a located generally on an opposite side of a medial plane bisecting the fastener tab 16 from the recess 16b. When the fastener tabs 16 oppose one another with the fastener 20 fully tightened, the tongue 16a is received in the recess 16b. Each recess 16b can be slightly larger than the tongue 16a to receive the tongue 16a of the opposed clamp segment and form a tongue-and-recess interfit when the fastening tabs are brought together in their full confronting relationship by the fastener tab 16. It is understood that the shape of the tongue 16a and the shape of the recess 16b can be any shape such that the tongue 16a fits within the recess 16b. The tongue 16a can include an external surface that mates or confront an internal recess 16b in which the surfaces are angled or skewed with respect to an axis disposed normal to the mating face of the fastener tab 16 as depicted, for example, in FIG. 2A. The complementary angled surfaces facilitate engagement and disengagement of the fastener tabs upon corresponding tightening and loosening of the fastener 20. The angled surfaces can facilitate interaction between the twin clamp segments 12a, 12b with non-interference for use with the single clenchable fastener 20.

Figure 5:
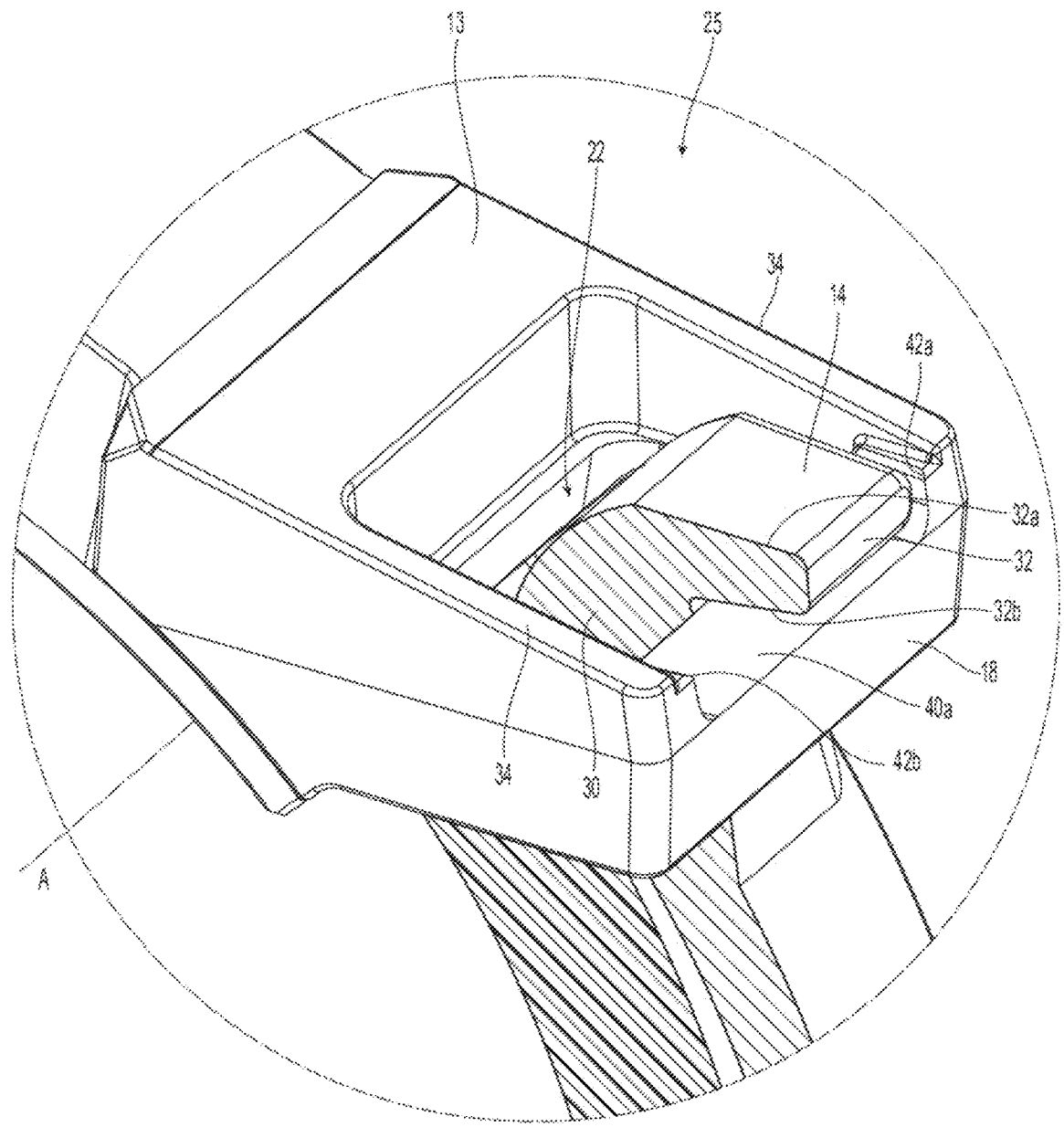
FIG. 5 is a detailed perspective partial cross-sectional view of an interlock for use in the pre-assembled pipe coupling of FIG. 1.
Figure 6:
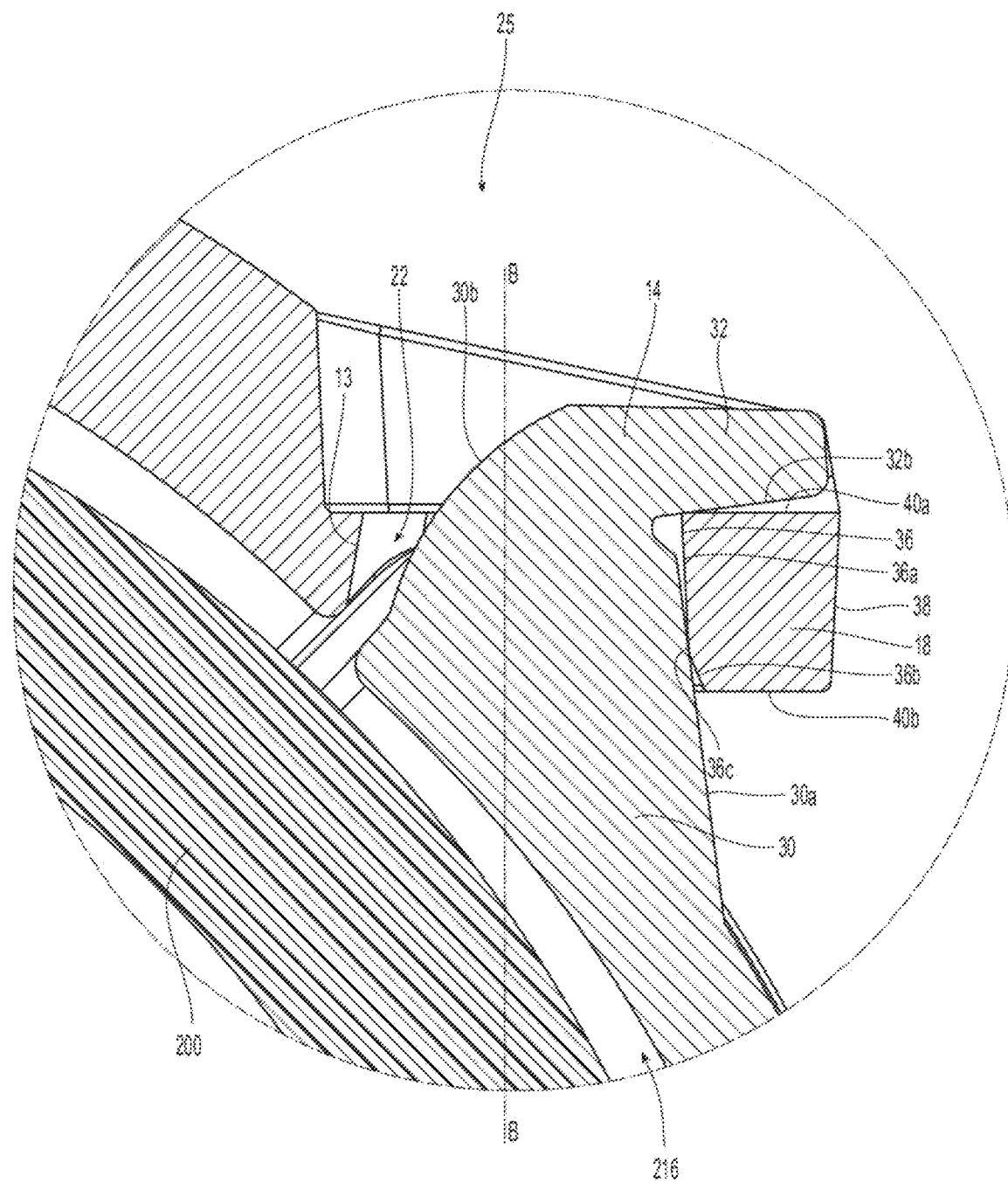
FIG. 6 is a detailed cross-sectional view of the interlock of FIG. 5 in an open configuration.
Figure 7:
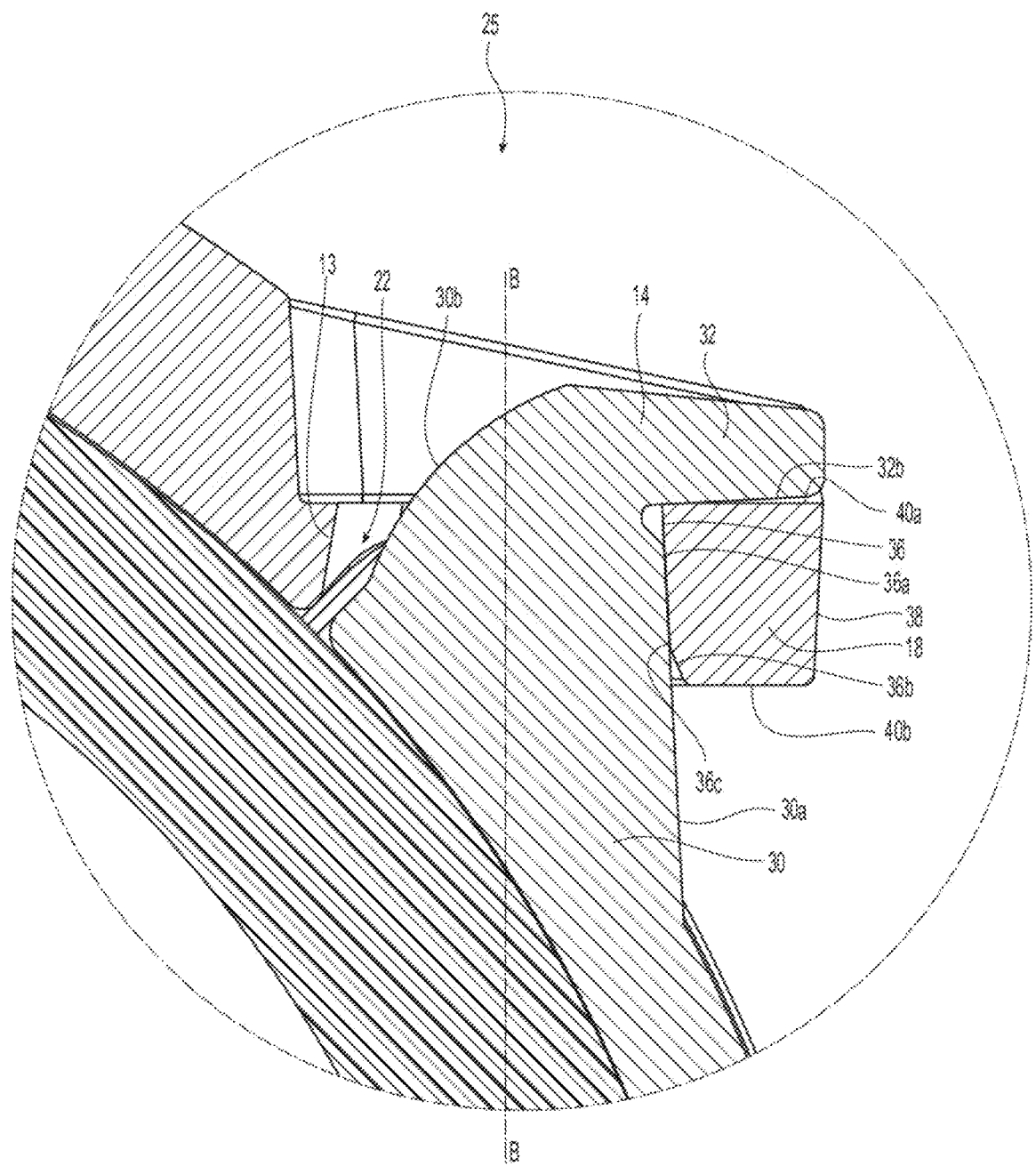
FIG. 7 is a detailed cross-sectional view of the interlock of FIG. 5 in a closed configuration.

In the assembly 10, each hook 14 is mounted within one of the two apertures 22 or mounting holes preferably identically formed at the opposite ends of the bridge segment 12c. Shown in FIGS. 5-7 are detailed views showing the interaction between a mount 18 of the bridge segment and a hook 14 of the clamp segment to form the attachment mechanism of interlock 25. The interlock 25 facilitates the manual manipulation of the twin clamp segments 12a, 12b. The interlock 25 can eliminate the need for one or more additional fasteners (in addition to fastener 20), reducing the complexity of installation while maintaining or increasing the security provided by coupling 10. The hook 14 of each clamp segment 12a, 12b can include a base 30 and a catch 32 in which the base 30 preferably tapers narrowly in a direction toward the catch 32. Relative to the internal bend of the hook 14, the base 30 can have an inner surface 30a and an outer surface 30b that converge toward one another in the direction toward and contiguous with the catch 32. The outer surface 30b of the base 30 can have a curved portion or profile contiguous with the catch 32 to facilitate insertion of the hook 14 through the aperture 22 to form the interlock 25. In the interaction between the hook 14 and the mount 18, each of the inner and outer surfaces 30a, 30b can extend between the wall 13 of the bridge 12c and the mount 18. In the bridge segment 12c, each mount 18 can be disposed laterally of the wall 13 with a pair of laterally extending spaced apart sidewalls 34 formed between the mount 18 and the wall 13 to define the aperture 22. Accordingly, each of the wall 13, mount 18 and sidewalls 34 can provide internal and external surfaces with respect to the aperture 22. For example, the laterally disposed mount 18 has an internal wall 36 and an external wall 38 with an upper floor surface 40a and a lower floor surface 40b extending between the internal and external walls 36, 38. For the mounts 18, which can be identical, respective upper floor surfaces 40a and thus the boundary of each aperture 22 can be substantially coplanar with one another in a plane P disposed perpendicular to the bisecting plane and parallel to the coupling axis A-A. While the boundary of the apertures 22 is depicted to be coplanar in the plane P, each aperture boundary can be disposed in separate parallel and offset planes each of which is perpendicular to the bisecting plane and parallel to the coupling axis A-A. The corresponding apertures 22 and their perimeters can be coplanar within the same plane P. The catch 32 can be wedge shaped and can taper narrowly in a direction away from the base 30. The catch 32 can have a planar upper surface 32a with a planar lower retention surface 32b to confront the upper floor 40a of the mount 18 in the various interlock formations as described herein. The hook 14 can be formed with a radius portion or transition between the inner surface 30a of the base 30 and the retention surface 32b of the catch 30.

The internal wall 36 of the mount 18 of the bridge segment 12c, along with the surfaces of the sidewalls 34 and the end of the wall 13, can define the overall geometry of the aperture 22 and the interaction between the hook 14 and the mount 18. As depicted in FIG. 6, the aperture 22 can have depth defined by the axial spacing between the upper and lower floors 40a, 40b along a central axis B-B of the aperture 22. Additionally, the aperture 22 can define a variable length defined by the lateral spacing between the internal end surface of the wall 13 and the internal wall 36 of the mount 18 about the axis B-B. Each of the end surface of the wall 13 and internal wall 36 define varying profiles with respect to the axis B-B. For example, the internal wall 36 has a first surface 36a angled with respect axis B-B and a second surface 36b angled with respect to the first surface 36a to define an edge 36c located at the intersection of the first and second surfaces 36a, 36b. The first and second surfaces 36a, 36b can be angled such that the upper floor 40a has a greater length in the lateral direction than the lower floor 40b. The upper floor 40a and its spacing from the end surface of the wall 13 cinctures the aperture 22. Accordingly, the aperture 22 can include a generally tapering opening facing the hook 14 upon insertion in the axial direction from the lower floor surface 40b to the upper surface 40a.

The attachment mechanisms and relative spacing between the segments can allow for the segments to be manually manipulated to define various states of the coupling assembly 10 and: (i) establish the insertion boundary 11 for axial pipe insertion and (ii) engage the outer pipe surface and compress the gasket 200 about the inserted pipe to form the fluid tight seal about the pipe ends. To attach a clamp segment 12a, 12b to the bridge segment 12c, the hook 14 can be inserted into the aperture 22 proximate the lower floor 40b of the mount 18. The curved outer surface 30b of the base 30 can facilitate insertion of the hook 14 through the aperture 22 to form the interlock 25. The catch 14 can be brought through the aperture 22 proximate the upper floor 40a of the mount 40 such that the retention surface 32b confronts the upper floor 40a with a gap therebetween. In a first open configuration of the interlock 25 in which the clamp segments 12a, 12b have been manually manipulated to their required position for defining the insertion boundary 11, the retention surface 32b forms a line contact with the inner edge of the upper floor 40a, as depicted for example, in FIG. 6. Moreover, the inner surface 30a of the base 30 forms a line contact with the intersection 36c of surfaces 36a, 36b on the internal wall 36 of the mount 18. In a closed configuration of the interlock 25 as depicted, for example in FIG. 7, the hook 14 can be pivoted about the intersection 36c to increase the confrontation between the retention surface 32b and the upper floor 40a such that the gap between the retention surface 32b and the floor 40a is reduced and in some instances can include surface contact between the retention surface 32b and the floor 40a. In the closed configuration, the inner surface 30a of the base 30 is brought into surface contact with the first surface 36a of the internal wall 36 of the mount 18. Accordingly, the intersection 36c can form a fulcrum on which the hook 14 pivots. Surfaces of the hook 14 and the mount 18 can be reversed or have a combination of surface such that the inner surface 30a of the hook base 30 defines a fulcrum on which the mount internal wall 36 pivots to form the closed configuration of the interlock 25. The pre-assembled coupling 10 can provide the interlock 25 with an internal pivot.

With reference to the perspective view of the interlock 25 shown in FIG. 5, the hook 14 and mount 18 each define a width in the direction of the coupling axis A-A. To further facilitate the interlock formation and the confrontation between the catch 32 and the upper floor 40a, the floor 40a includes a pair of guides 42a, 42b disposed on the floor 40a about the width of the mount 18 at the greatest lateral extent of the floor 40a. Each of the guides 42a, 42b can extend from the upper floor 40a to the top or upper surface of the sidewalls 34 or anywhere in between. In the closed configuration of the interlock 25, the guides 42a, 42b confront the sides of the catch 32 to restrict lateral movement between the hook 14 and the mount 18 and/or can center the catch 32 over the floor 40a. Accordingly, the spaced apart guides 42a, 42b in conjunction with the floor 40a can define a recess for receipt of the hook 14 and the catch 32.

Figure 9:
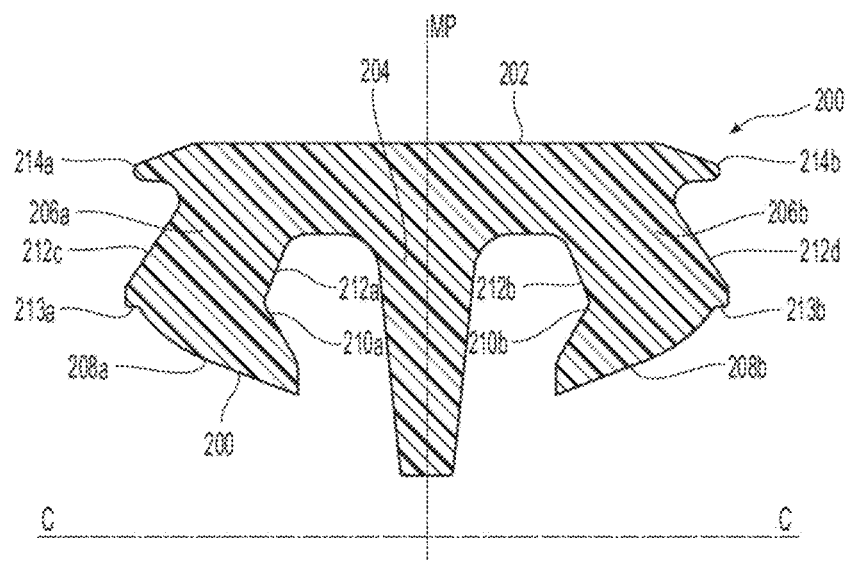
FIG. 9 is a partial cross-sectional view of a gasket for use in the pre-assembled coupling of FIG. 1.

With reference to the cross-sectional view of the gasket 200 depicted in FIG. 9, the gasket 200 includes an annular base 202 disposed about a gasket axis C-C which extends parallel to the coupling axis A-A in the assembly 10. A central flange 204 can be an elongate member that extends from the annular base toward the gasket axis C-C and is generally disposed in or about a central plane perpendicular the gasket axis and parallel to the medial plane MP. Symmetrically formed and spaced oppositely about the central flange 204 are a pair of side flanges 206a, 206b. Each side flange 206a, 206b includes a scaling lip 208a, 208b for gripping and/or forming a fluid tight seal with the outer surface of an inserted pipe end. As is described in greater detail below, as the pipe end is inserted axially into the gasket 200, the pipe end contacts a side flange 206a causing it to fold or collapse with the sealing lip forming the fluid tight seal about the pipe surface. The internal surfaces of the gasket 200 can include a flex point 210a, 210b formed between the central flange 204 and side flanges 206a, 206b to facilitate collapse of the flanges upon pipe insertion. More specifically, each of the first and second side flanges 206a, 206b can have an inner surface 212a, 212b contiguous with the central flange 204 which defines the flex points 210a, 210b. The inner surfaces 212a, 212b between the flex points and the central flange 204 can define a positive-slope transition portion between the sealing lips 208a, 208b and the central flange 204 which allows the side flanges 206a, 206b to fold in a desired manner.

The gasket 200 also includes structures that facilitate its contact with the interior surface of the housing. Each of the side flanges 206a, 206b can include a buttress 214a, 214b which extends axially in the direction of the gasket axis C-C toward the housing interior wall or surface 13b. Each buttress 214a, 214b extends axially from the side flanges 206a, 206b and has a tapering configuration to a terminal preferably radiused end. The buttresses 214a, 214b act against the interior surface 13b of the housing segments 12 to resist axial gasket displacement and facilitate gasket expansion within the housing upon insertion of the pipe end. Each of the first and second side flanges 206a, 206b can have an outer surface 212c, 212d that includes a heel 213a, 213b, which assists in guiding axial insertion of the pipe end, maintains contact between the pipe end and the sealing lip 208a, 208b, and also acts against the interior surface 13b of the housing to center the gasket 200 within the housing. The heels 213a, 213b are the outermost edge of the sealing lips 208a, 208b axially spaced from the central flange 204 to define the entrance perimeter through which a pipe end is inserted into the gasket 200. Each of the heels 213a, 213b have a profile defined by portions of the outer surfaces 212c, 212d that are disposed at right angles; however, an acute angle can be utilized. In the fluid tight sealed configuration of the coupling 10 described herein, the heel 213a, 213b lies against the pipe end outer surface and can present an abutment to the interior surface 13b of the housing to keep the gasket 200 centered within the housing.

Referring again to FIGS. 3 and 6, the fastener 20 is shown with the nut 20b threaded on the leading end of the bolt such that the clamp segments 12a, 12b are attached and manually spaced apart or opened to the maximum extent. Even with the segments at their maximized spacing, the gasket 200 remains contained within one or more cavities 19 of the housing thereby preventing unintended separation of the gasket 200 from the housing prior to pipe end insertion. Moreover, at the fully open configuration of the housing, the gasket 200 is free to move within the containment volume of the housing. Thus, for example, as shown in FIG. 3, under the force of gravity the gasket 200 can come to rest in contact with the interior of the housing proximate the fastening tabs 16a, 16b of the two clamp segments 12a, 12b of the housing. Depending upon the orientation of the housing, the gasket 200 can come to rest anywhere within any one or more of the cavities 19a and 19b of the clamp segments. Regardless of the orientation of the housing, the cavity 19c and the gasket 200 can define chamber 216. Accordingly in the open configuration of the coupling 10 with the twin clamp segments 12a, 12b manually manipulated to their maximum spaced orientation about the fastener and the exterior of the gasket in partial contact with the interior of the housing, the remainder of the outer annular surface of the gasket 200 is radially spaced from the interior surface 13b of the housing to define a chamber therebetween. With the gasket 200 contained within the housing, the sealing lips 208a, 208b and in particular their heels 213a, 213b can be within the insertion boundary 11 for receipt of a pipe end.

Figure 10:
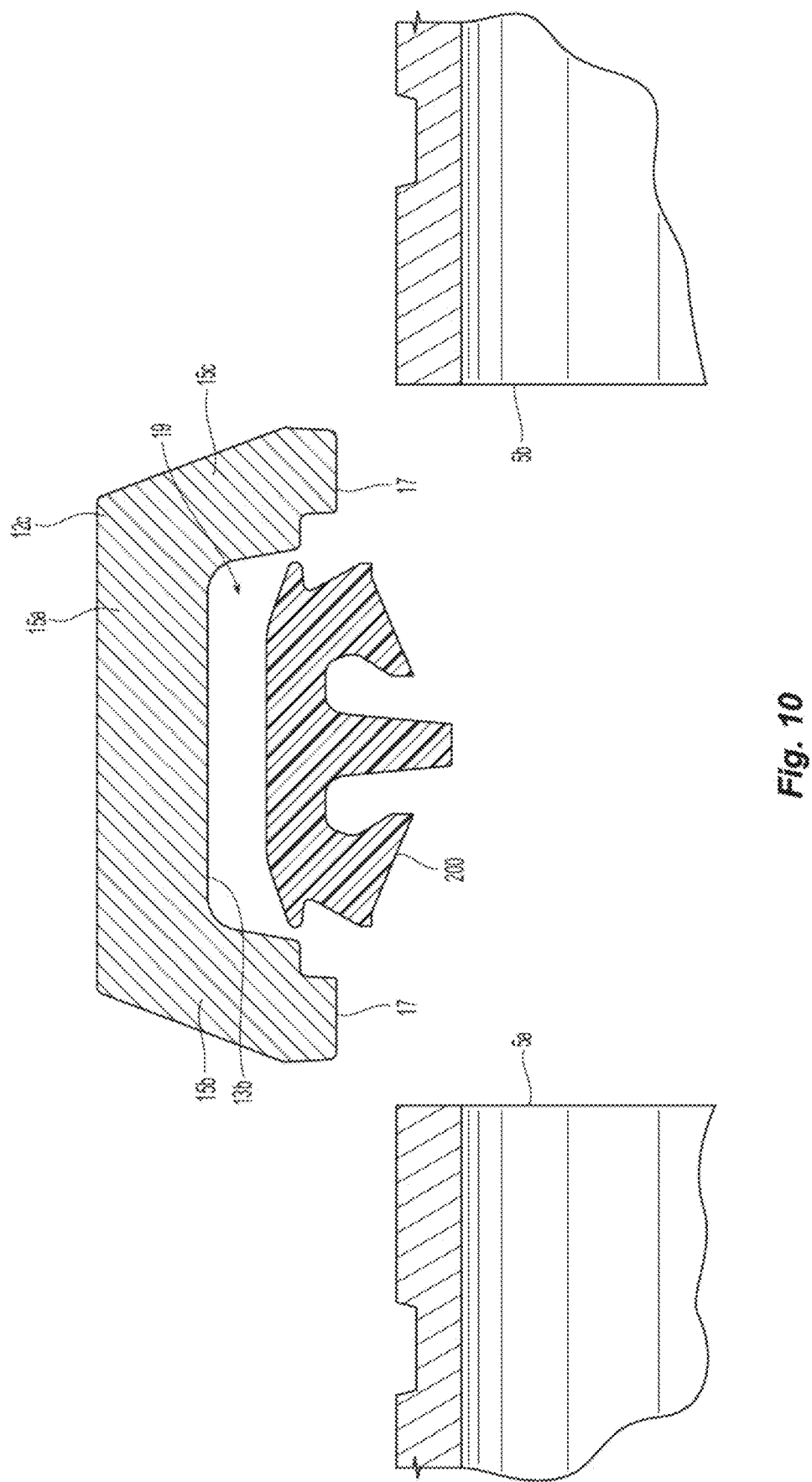
FIGS. 10-15 are partial cross-section views of a pipe joint formation using the pre-assembled coupling of FIG. 1.
Figure 11:
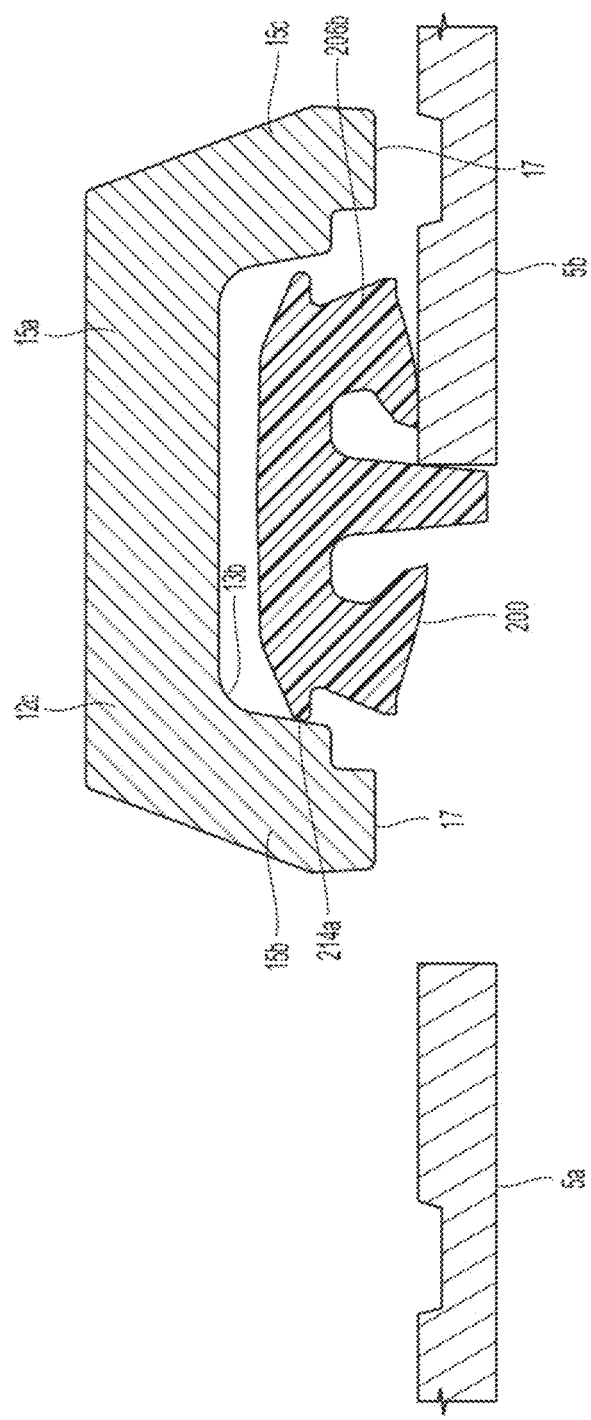
Figure 12:
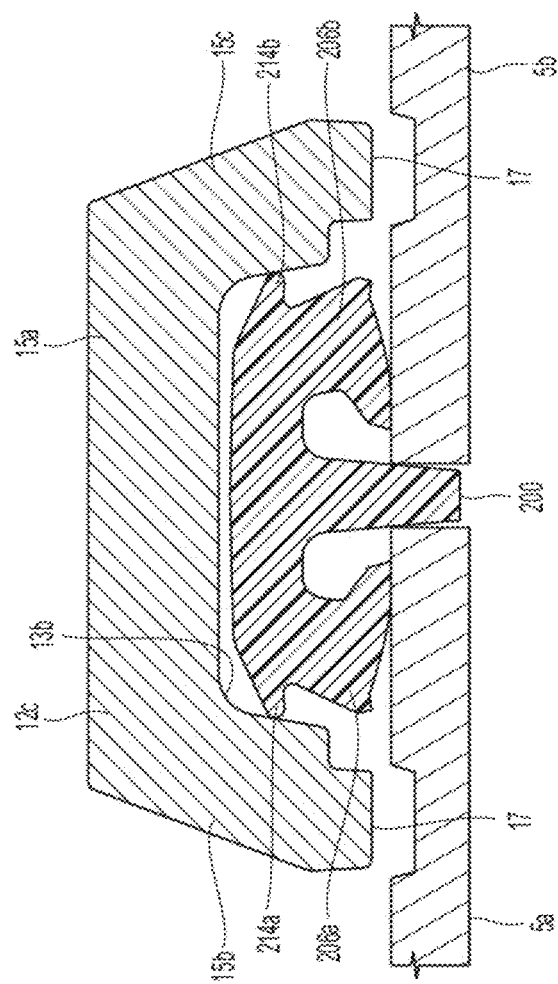
Figure 13:
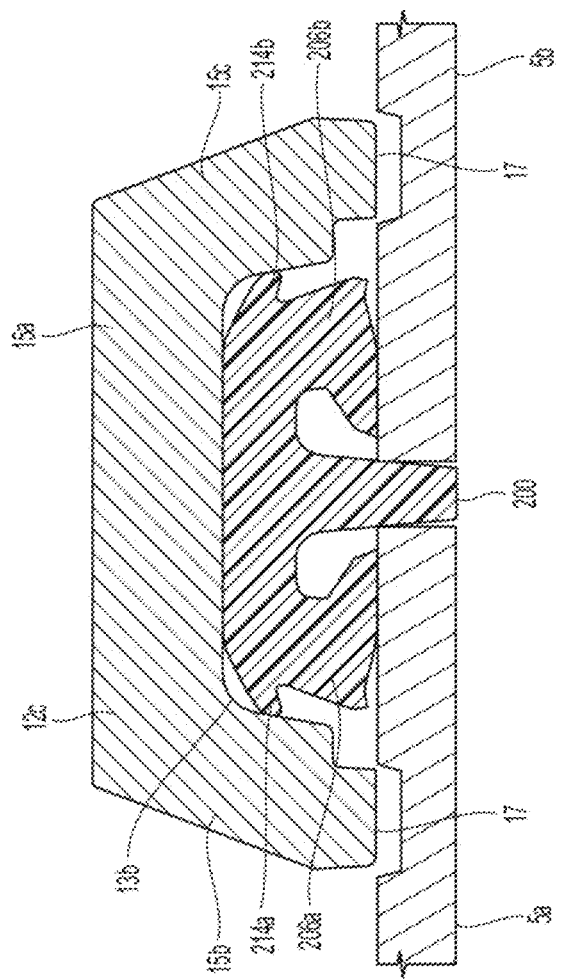
Figure 14:
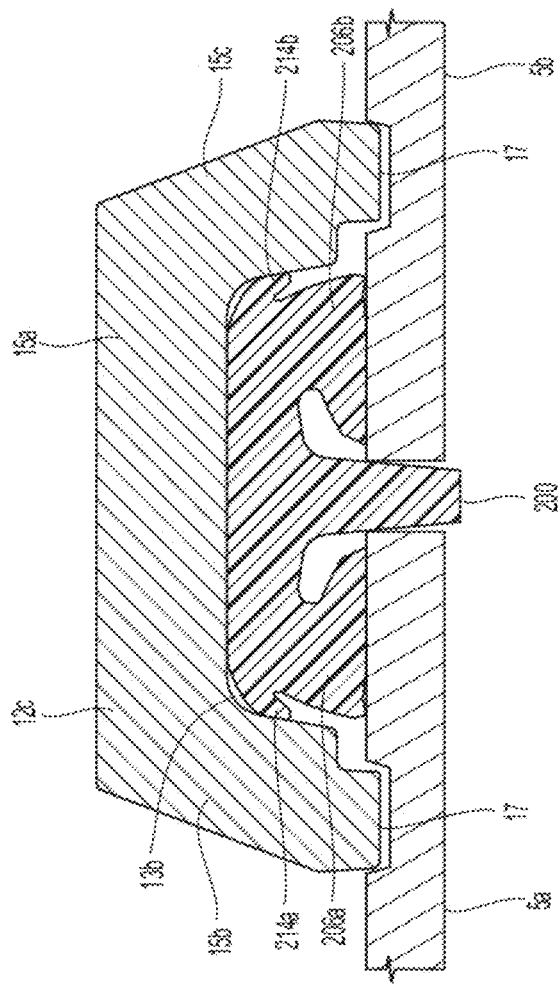
Figure 15:
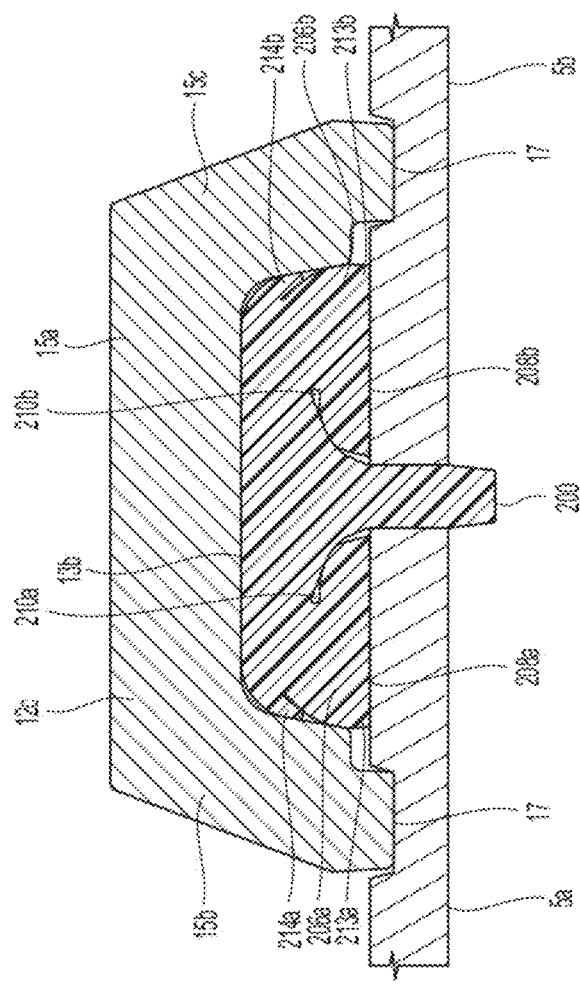

The gasket 200 can be located and contained within the housing with at least one coupling segment suspended about the gasket 200. In the open configuration in which the clamp segments 12a, 12b locate and contain the gasket member within the insertion boundary 11, the bridge segment 12c can be suspended about the gasket 200 with its interior surface 13 spaced from the external annular surface of the gasket 200 and the cavity 19 unfilled therebetween. FIGS. 10-15 illustrate the assembly of a pipe joint using the pre-assembled coupling assembly 10. Shown in FIG. 10 is a cross-sectional detailed view of the coupling 10 taken at the bisecting plane through the bridge segment 12c suspended above the gasket 200 and with the manually manipulated clamp segments 12a, 12b (not shown); two pipe ends 5a, 5b are positioned for axial insertion into the insertion boundary 11. The gasket 200 be supported on at least one of the two clamp segments 12a, 12b (not shown) in a manner as previously described with its sealing lips 208a, 208b positioned within the insertion boundary 11 for receipt of the pipe ends 5a, 5b. FIG. 11 shows a first pipe end 5b inserted into the coupling 10. The pipe end 5b impacts the side flange 206b causing it to deflect inward toward the central flange 204. The pipe insertion causes the gasket 200 to shift sideways such that the buttress 214a, opposite the deflected side flange 206b, impacts the interior surface 13b of the lateral portion 15b of the segment 12c. The interaction between the buttress 214a and the interior surface 13b ensures the gasket 200 is retained within the housing, and facilitates centering of the gasket within the housing. Moreover the pipe insertion causes the gasket 200 to expand such that the outer peripheral surface of the gasket is expanded, such that it moves closer to the interior surface 13b of the medial portion thereby reducing the size of chamber 216. Due to the interaction of the sealing lips 208b gripping the outer surface of the pipe and the relative size of the outside diameter of the pipe 5b and the sealing lip 208b, the gription of the sealing lip 208b grabs pipe 5b. The gription of the sealing lip 208b can be sufficient to retain the pre-assembled coupling in position on the pipe 5b when the pipe 5b is disposed at various angular orientations relative to a horizontal plane and the pipe axis. Accordingly, the sealing lips 208a, 208b can have an interference fit with the pipes 5a. In FIG. 12, the second pipe end 5a has been inserted, the gasket 200 recenters and further expands within the chamber 216 and bringing the opposite buttress 214b into contact with the interior surface 13b of the adjacent lateral portion 15c. With the pipe ends 5a, 5b fully inserted, the central flange 204 extends between the pipe ends 5a, 5b, and the sealing lips 208a, 208b grip the outer surface of the pipe ends 5a, 5b as seen for example in FIG. 13. Shown in FIG. 14 is the coupling 10 being tightened about the pipe ends with the pipe engagement members 17 being brought into engagement with the pipe grooves. The gasket 200 is further compressed within the chamber 216 such that the heels 213a, 213b are brought into engagement with the outer pipe surface and the buttresses 214a, 214b are deflected toward the pipe. In FIG. 15, the fastener 20 is fully tightened to bring the fastener tabs 16 of the clamp segments 12a, 12b together and enclose the gasket 200 about the pipe ends 5a, 5b such that the sealing lips 208a, 208b fully fold to form a fluid tight seal about the pipe ends 5a, 5b. The pipe engagement members 17 are engaged within the outer pipe grooves, such as with complete contact between the base of the groove and the engagement member 17 to form a rigid pipe joint. Furthermore, the pre-assembled coupling 10 provides a method for forming a rigid pipe joint in which a gasket is suitably located and contained within the coupling housing by manual manipulation of the clamp segments of the housing prior to insertion of the pipe ends to be joined. The pre-assembled coupling can provide that the pipe ends upon insertion are gripped and retained by the gasket prior to tightening of the single clenchable fastener. Moreover, the pre-assembled coupling can provide for expansion of the gasket upon pipe insertion and can utilize a single clenchable fastener to form a fluid tight seal between the gasket and the inserted pipe ends.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

While the present disclosure has been disclosed with reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A pre-assembled pipe coupling, comprising:
   a gasket disposed about a gasket axis, the gasket axis defining a plane perpendicular to the gasket axis;
   a first segment, comprising:
      one of a first mount or a first hook; and
      one of a second mount or a second hook;
   a second segment, comprising:
      the other of the first mount or the first hook, the first mount defining a first aperture; and
      a first tab defining a first fastener aperture;
   a third segment, comprising:
      the other of the second mount or the second hook, the second mount defining a second aperture, the first hook disposed in the first aperture and the second hook disposed in the second aperture, the first segment, the second segment, and the third segment each have a wall having an exterior surface and an interior surface facing the gasket axis; and
      a second tab defining a second fastener aperture; and
   a fastener disposed in the first fastener aperture and the second fastener aperture.

2. The pre-assembled pipe coupling of claim 1, comprising:
   the one of the first mount or the first hook and the one of the second mount or the first hook arranged apart from one another in the plane relative to the gasket axis at opposite ends of the first segment.

3. The pre-assembled pipe coupling of claim 1, comprising:
   the interior surface forming a cavity to receive the gasket.

4. The pre-assembled pipe coupling of claim 1, comprising:
   the first hook comprises a base and a catch towards which the base tapers.

5. The pre-assembled pipe coupling of claim 1, comprising:
   the first mount comprises an internal wall, an external wall, and an upper floor surface and lower floor surface extending between the internal wall and the external wall.

6. The pre-assembled pipe coupling of claim 1, comprising:
   the first mount comprises an internal wall, an external wall, and an upper floor surface and lower floor surface extending between the internal wall and the external wall, the upper floor surface defining a boundary of the first aperture.

7. The pre-assembled pipe coupling of claim 1, comprising:
   the first hook comprises a base and a wedge-shaped catch towards which the base tapers.

8. The pre-assembled pipe coupling of claim 1, comprising:
   the first mount comprises an internal wall, an external wall, and an upper floor surface and lower floor surface extending between the internal wall and the external wall, the upper floor surface longer than the lower floor surface.

9. The pre-assembled pipe coupling of claim 1, comprising:
   the gasket comprises:
      an annular base disposed about the gasket axis;
      an elongate member that extends from the annular base towards the gasket axis; and
      a pair of side flanges formed oppositely about a central flange, each side flange of the pair of side flanges comprising a buttress extending from the side flange and tapering to a terminal end.

10. The pre-assembled pipe coupling of claim 1, comprising:
    the fastener comprises a nut and a bolt.

11. A pipe coupling, comprising:
    a gasket disposed about a gasket axis;
    a housing comprising a plurality of segments, the plurality of segments comprising:
       a first segment, comprising:
          one of a first hook or a first mount forming a first opening; and
          one of a second hook or a second mount forming a second opening;
       a second segment, comprising:
          the other of the first hook or the first mount; and
          a first tab defining a first fastener opening;
       a third segment, comprising:
          the other of the second hook or the second mount, the first hook disposed in the first opening and the second hook disposed in the second opening, the first segment, the second segment, and the third segment each have a wall having an exterior surface and an interior surface facing the gasket axis; and
          a second tab defining a second fastener opening; and
    a fastener disposed through the first fastener opening and the second fastener opening, the fastener comprising a nut and a bolt.

12. The pipe coupling of claim 11, comprising:
    the interior surface forming a cavity to receive the gasket.

13. The pipe coupling of claim 11, comprising:
    the first hook comprises a base and a catch towards which the base tapers.

14. The pipe coupling of claim 11, comprising:
the first mount comprises an internal wall, an external wall, and an upper floor surface and lower floor surface extending between the internal wall and the external wall.

15. The pipe coupling of claim 11, comprising:
the first mount comprises an internal wall, an external wall, and an upper floor surface and lower floor surface extending between the internal wall and the external wall, the upper floor surface defining a boundary of the first opening.

16. The pipe coupling of claim 11, comprising:
the first hook comprises a base and a wedge-shaped catch towards which the base tapers.

17. The pipe coupling of claim 11, comprising:
the first mount comprises an internal wall, an external wall, and an upper floor surface and lower floor surface extending between the internal wall and the external wall, the upper floor surface longer than the lower floor surface.

18. The pipe coupling of claim 11, comprising:
the gasket comprises:
- an annular base disposed about the gasket axis;
- an elongate member that extends from the annular base towards the gasket axis; and
- a pair of side flanges formed oppositely about a central flange, each side flange of the pair of side flanges comprising a buttress extending from the side flange and tapering to a terminal end.

* * * * *